(12) United States Patent
Berry et al.

(10) Patent No.: US 6,434,575 B1
(45) Date of Patent: Aug. 13, 2002

(54) METHOD OF INSTRUMENTING GARBAGE COLLECTION GENERATING A TRACE FILE MAKING A SINGLE PASS ANALYSIS OF OBJECT HEAP

(75) Inventors: Robert Francis Berry; Raymond M. Bryant; Weiming Gu; John Day Howard; William Robert Reynolds; Robert J. Urquhart, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/190,562

(22) Filed: Nov. 12, 1998

(51) Int. Cl.[7] .............................................. G06F 12/00
(52) U.S. Cl. ....................... 707/206; 707/101; 707/103; 717/148; 717/154
(58) Field of Search ........................ 707/1, 100–104.1, 707/200, 205–206; 711/5–6, 132, 135, 154, 156, 202–203, 205–206, 165, 170; 712/26, 201–202, 209, 217; 717/4–6, 9, 147–148, 141; 709/100, 104

(56) References Cited

U.S. PATENT DOCUMENTS

| | | | | |
|---|---|---|---|---|
| 5,321,834 A | * | 6/1994 | Weiser et al. | 707/206 |
| 5,392,432 A | * | 2/1995 | Engelstad et al. | 707/103 |
| 5,903,899 A | * | 5/1999 | Steele, Jr. | 707/206 |
| 5,953,736 A | * | 9/1999 | O'Connor et al. | 711/6 |
| 6,026,485 A | * | 2/2000 | O'Connor et al. | 712/226 |
| 6,070,173 A | * | 5/2000 | Huber et al. | 707/206 |
| 6,098,080 A | * | 8/2000 | Endicott et al. | 707/206 |
| 6,105,040 A | * | 8/2000 | Agesen | 707/206 |
| 6,286,016 B1 | * | 9/2001 | Heller et al. | 707/206 |

FOREIGN PATENT DOCUMENTS

| | | | |
|---|---|---|---|
| WO | WO-9964955 A1 | * 12/1999 | ............. 12/2 |
| WO | WO-0060469 A1 | * 10/2000 | ............. 12/2 |

OTHER PUBLICATIONS

Chang et al., Evaluation of an object–caching coprocessor design for object oriented systems, computer Design: VLSI in computers and proceedings 1993, IEEE international conference, pp. 132–139.*

Medina, R, Incremental garbage collection for causal relationship computation in distributed systems, Parallel and distributed processing, 1993, proceding fifthe IEEE symposium, Dec., 1993, pp. 650–655.*

Washabaugh, DM et al., Distributed garbage collection of active objects, distributed computing systems, 1991, 11th Internationa conference, May 1991, pp. 369–376.*

* cited by examiner

Primary Examiner—John Breene
Assistant Examiner—Srirama Channavajjala
(74) Attorney, Agent, or Firm—Barry S. Newberger; Winstead Sechrest & Minick P.C.; Jeffrey S. LaBaw

(57) ABSTRACT

A method and apparatus for instrumenting garbage collection in a data processing system is provided. During garbage collection, a pass is made through the object heap and a plurality of heap data is retrieved and written to a trace file. The data may include the type of object, the size of the object on the heap, the class of the object, if appropriate, and a plurality of pointers, including live set pointers, and one or more tags representing attributes that may be associated with the particular object. The instrumentation may controlled to occur at a preselected phase of the garbage collection process. Additionally, a user may dynamically initiate a garbage collection instrumentation if the user determines that an event has occurred during the operation of the data processing system about which the user wishes further data.

29 Claims, 4 Drawing Sheets

METHOD OF INSTRUMENTING GARBAGE COLLECTION GENERATING A TRACE FILE MAKING A SINGLE PASS ANALYSIS OF OBJECT HEAP

TECHNICAL FIELD

The present invention relates in general to a data processing system, and in particular, to the instrumentation of garbage collection in a data processing system.

BACKGROUND INFORMATION

In Java, as well as other programming languages such as Lisp and Smalltalk, memory management is automatically performed. Objects are allocated in a runtime data area called the heap, and are deallocated when no longer needed. In the Java context, the Java Virtual Machine (JVM) specification dictates that objects be deallocated when they are no longer required by the JVM. Deallocating an object that is no longer required by the executing software frees the space on the heap occupied by the object to be deallocated. The process by which objects in these languages, such as Java, are identified for deallocation, and the heap space which they occupy deallocated, when required, is referred to as garbage collection.

In addition to freeing space on the heap, the garbage collection process may compact the heap. In this way, the garbage collection process repairs fragmentation of the heap which occurs as objects of varying sizes are allocated on the heap during the course of execution of a Java or other language program which performs garbage collection. Thus, at a minimum, garbage collection must be done when there is insufficient space on the heap to allocate an object created by the executing software.

Although essential to the operation of the software, garbage collection consumes processing cycles that may otherwise be used by the executing application. In this respect, garbage collection may be costly. Moreover, errors in the garbage collection routines can cause failures in application software written in a programming environment which does garbage collection. Therefore, there is a need in the art for methods and apparatus which instrument the garbage collection process in a data processing system. Data generated by the instrumentation process may then be used to design changes in the garbage collection mechanism. The instrumentation apparatus and methods may then be used to generate data which may be analyzed to measure the effectiveness of any implemented changes.

SUMMARY OF THE INVENTION

The aforementioned needs are addressed by the present invention. Accordingly, there is provided, in a first form, a method of garbage collection instrumentation. The method includes the step of generating a trace file, in which the step of generating a trace file constitutes making a single pass analysis of each object on an object heap, and writing a plurality of object data retrieved in the single pass analysis to an output file.

There is also provided, in a second form, a data processing system for instrumenting garbage collection. The data processing system contains circuitry operable for generating a trace file, which includes circuitry operable for making a single pass analysis of each object on an object heap, and writing a plurality of object data retrieved in the single pass analysis to an output file.

Additionally, there is provided, in a third form, a computer program product operable for storage on program storage media, wherein the program product is operable for garbage collection instrumentation. The program product contains programming operable for generating a trace file, in which programming operable for generating a trace file includes programming operable for making a single pass analysis of each object on an object heap, and programming operable for writing a plurality of object data retrieved in the single pass analysis to an output file.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
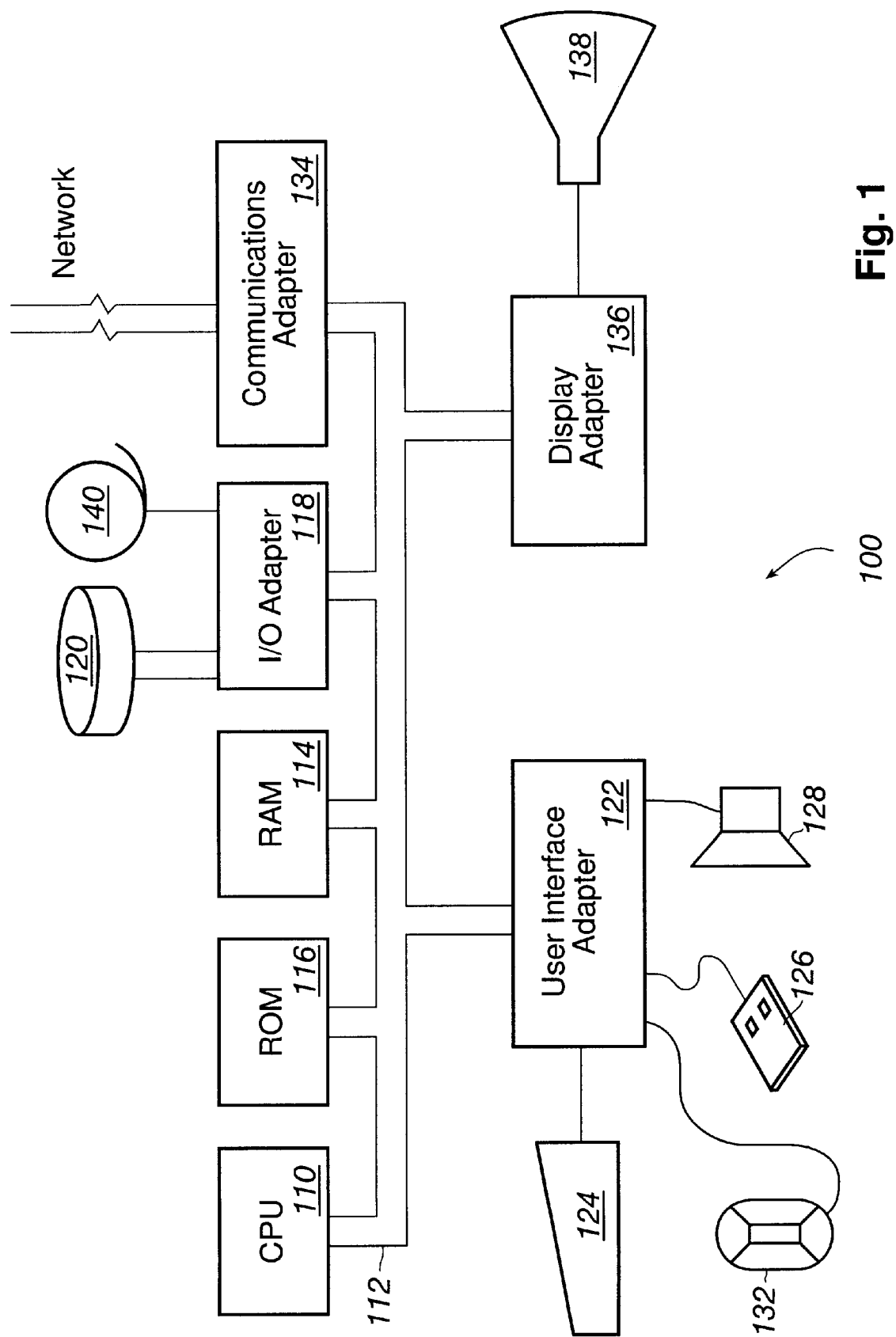
FIG. 1 illustrates, in block diagram form, a data processing system in accordance with one embodiment of the present invention.

The present invention provides a garbage collection instrumentation mechanism which collects data during a garbage collection process programming environment performing automatic memory management. The data may be gathered at different phases of the garbage collection process in accordance with preselected user input. The instrumentation identifies live objects and sweeps the heap gathering data related to the objects (both live and "dead") on the heap. A trace file containing the data is generated.

In the following description, numerous specific details are set forth to provide a thorough understanding of the present invention. For clarity, garbage collection instrumentation of the present invention may be described in the context of a JVM. However, it will be obvious to those skilled in the art that the present invention may be practiced without such specific details. In particular, the present invention may be practiced in other programming language contexts in addition to Java. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110. Garbage collection instrumentation of the present invention may be included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Alternatively, garbage collection instrumentation of the present invention may be included in RAM 114. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, track-ball 132 or mouse 126 and receiving output from the system via speaker 128 and display 138. Additionally, an operating system is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2A:
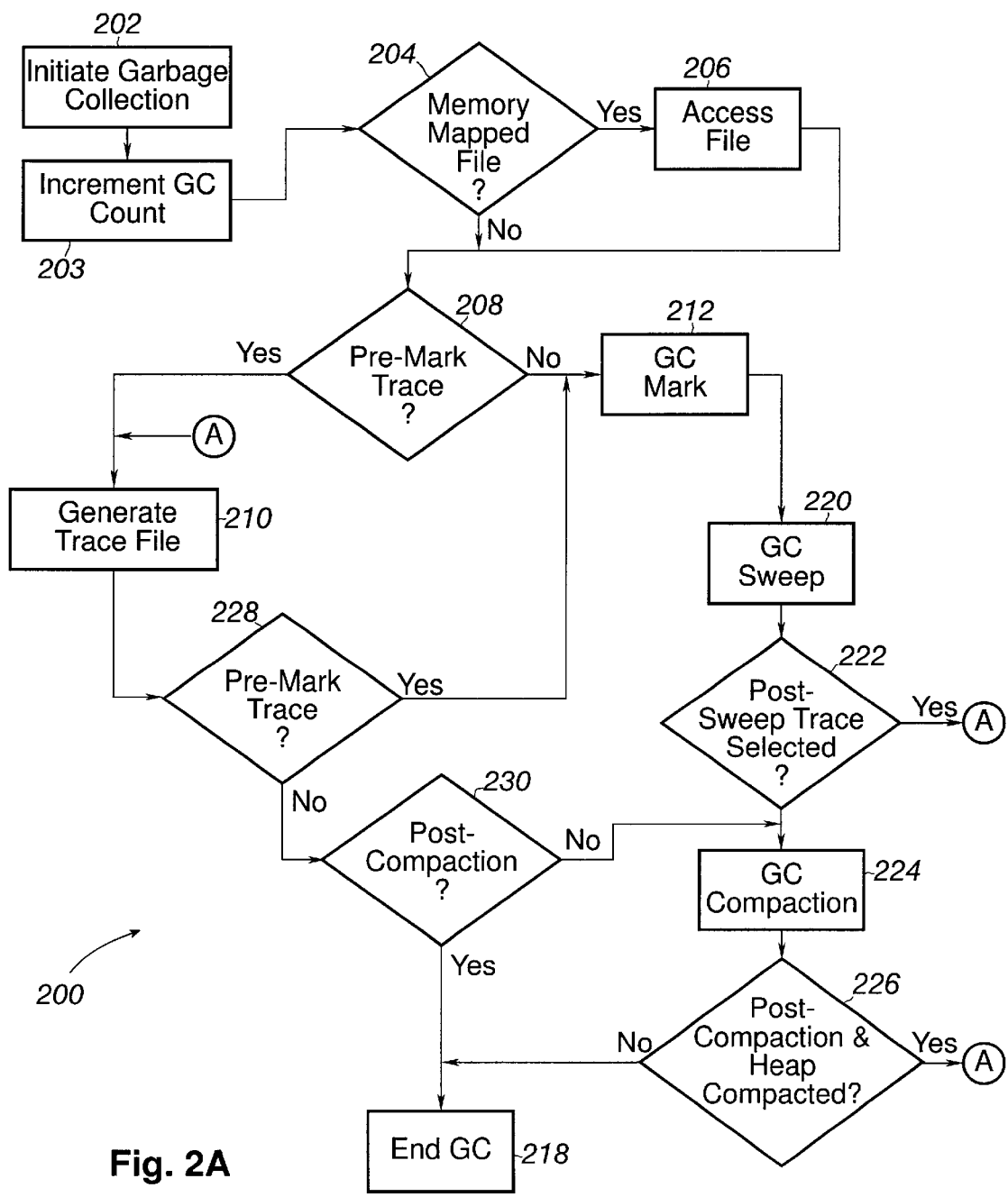
FIG. 2A illustrates, in flowchart form, a method of garbage collection instrumentation in accordance with an embodiment of the present invention.

Refer now to FIG. 2A in which is illustrated garbage collection instrumentation method 200 according to the present invention. Garbage collection (GC) initiates in step 202, and a garbage collection counter is incremented in step 203. (The counter is used in the control of the interval at which trace files are generated, as discussed further below.) In a JVM, for example, garbage collection uses a mark and sweep technique in which a pass is made through the JVM looking for pointers into the heap that point to valid objects. Valid pointers, those that are between the beginning and end of the heap and point to valid heap objects, are marked. Following the marking pass, the garbage collector then sweeps the heap, that is, frees objects that have not been marked. These steps will be discussed further, below.

In step 204, method 200 looks for a pre-selected memory-mapped file containing environmental variables controlling the garbage collection process. Controlling the process using a memory-mapped file allows the user of the invention to dynamically intervene in the garbage collection process while an application is running, thereby permitting the user to collect data when the user determines that an "interesting" event has occurred which the user wishes to explore further.

The method to be described in conjunction with steps 242–248 below provides a mechanism for inserting the instrumentation of the present invention into an application after the application has been started. Thus, if while the application is running, an "interesting" event, such as a crash, occurs, the user can control the instrumentation process, via the memory-mapped file, to turn on just before the "interesting" event occurs in order to obtain data reflecting the state of the heap prior to the occurrence of the interesting event. For example, in the Java context, in a Java web browser application, if during a browsing session, the browser crashes at the occurrence of a particular web page, garbage collection instrumentation can be selected to turn on just prior to accessing that page and the browser application restarted. Reference to the trace file may provide information as to the state of the heap generally and may reveal if the crash is due to an error in the garbage collection process, in particular. If, for example, during garbage collection, a live object is erroneously removed, the application may fatally crash. The ability to control the instrumentation process of the present invention via the memory-mapped file will be discussed in conjunction with FIG. 2B.

Figure 2B:
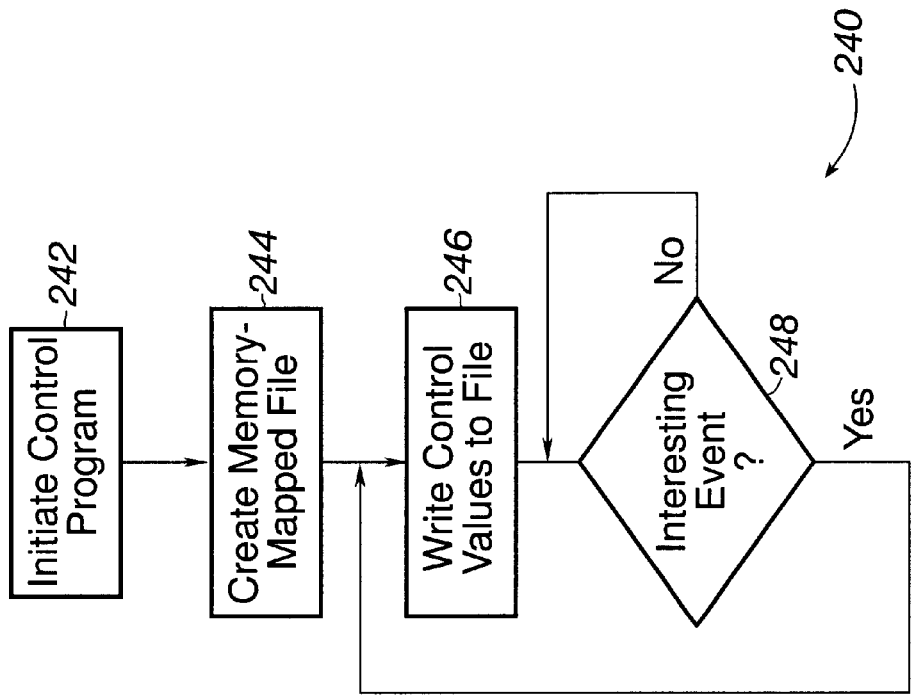
FIG. 2B illustrates a method of memory-mapped file generation in accordance with an embodiment of the present invention.

The memory-mapped file, which may reside, for example, in RAM 114 of data processing system 100 in FIG. 1, is generated by control program software, according to file generation method 240 illustrated in FIG. 2B. In step 242, the control program is initiated and in step 244 a memory-mapped file is created having a user pre-selected name. The memory-mapped file may be created in response to user input via a graphical user interface (GUI). Alternatively, the control program initiated in step 242 may input user provided data via a command line interface (CLI).

In step 246, control values, which may also be referred to as environmental values, for controlling garbage collection instrumentation method 200 are written to the memory-mapped file created in step 244. The control values may be written in response to user provided data via a GUI, or, alternatively, a CLI in accordance with alternative embodiments of the present invention.

Additionally, environmental values may have been defined and set via mechanisms within the operating system of data processing system 100. These may include reading the environmental values at boot from a batch file, and setting the environmental variables through a command interpreter within the operating system software.

Environmental variables may be used, for example, to customize the output files, the phase in the garbage collection process at which the dump is made, and control the frequency of dump file creation. Thus, in an embodiment of the invention, a pre-mark trace may be selected (discussed with respect to step 208, below) by setting an environmental variable (GC_DUMP1). Similarly, a trace file need not be generated each time garbage collection occurs. The number of garbage collection operations per trace file generation may also be controlled by an environmental value (GC_DCOUNT) in conjunction with the counter initialized in step 203. These examples are illustrative, not exhaustive and alternative sets of environmental values would be within the spirit and scope of the present invention.

If, in step 248, the user has observed an event of interest, new control values are written to the memory-mapped file created in step 244, whereby the user can control instrumentation method 200 when the user determines that an interesting event has occurred, and desires to retrieve heap data, in order to "diagnose" the event.

Returning to FIG. 2A, if, in step 204, the memory-mapped file exists, the file is accessed in step 206. The control values in the memory-mapped file are then used to control method 200.

If, in step 208, a pre-mark trace has been selected, method 200 continues, in step 210, to generate a trace file. A pre-mark trace file is generated before the garbage collection mark phase occurs. Selection of a pre-mark trace, as well as post-sweep and post-compaction traces, both discussed below, may be by environmental values. Trace file generation will be discussed further in conjunction with FIG. 2C, below.

If, however, in step 208, a pre-mark trace has not been requested, in step 212, a garbage collection mark phase is executed. In the mark phase, internal structures within the executing code are scanned to find pointers to live objects, which are marked as being in use. In an embodiment of the present invention constituting a JVM, the internal structures scanned may include the Java stack, the C stack, interned strings, Java Native Interface (JNI) global references, and "sticky" classes. The Java stack constitutes the operand stack for JVM instructions. In accordance with the JVM specification, JVM machine instructions all take operands from the Java stack, operate on them, and return results to the stack. The JNI allows the JVM to access native code, that is, code that is native to the platform on which the JVM is running. Native code is code that might be produced by the compilation and assembly of a high level programming language such as C or C++, and is represented by a set of instructions in object code native to the platform on which the JVM is running. Because a native function expects stack operands in accordance with native code conventions, a second stack, the C stack is also implemented in the JVM. Interned strings in Java are instances of String objects, and are immutable, representing string constants. They are maintained in a pool of strings which is initially empty, but to which objects are added when the executing Java program generates instances of string objects. Sticky classes are classes that are expensive to create and thus are kept even though there may be no live reference to them. The primitive classes are sticky classes, for example.

Pointers found in these internal structures define a subset of pointers to live objects, called, collectively, the root set. The set of pointers to live objects is called the live set. The root set is necessarily a subset of the live set. The live set may contain pointers to objects which are referred to by another object, but which do not correspond to pointers in the root set.

Method 200 continues with a garbage collection sweep in step 220. If a post-sweep trace has been selected in step 222, instrumentation method 200 continues by generating the trace file in step 210. Otherwise, instrumentation method 200 continues with the garbage collection compaction of the heap in step 224. Heap compaction is costly and may not be performed during each garbage collection operation. Heap compaction may be done when there is insufficient space on the heap to accommodate allocation of additional objects. If a post-compaction trace is requested and compaction has occurred in step 224, in step 226, method 200 returns to step 210 and a trace file is generated.

Figure 2C:
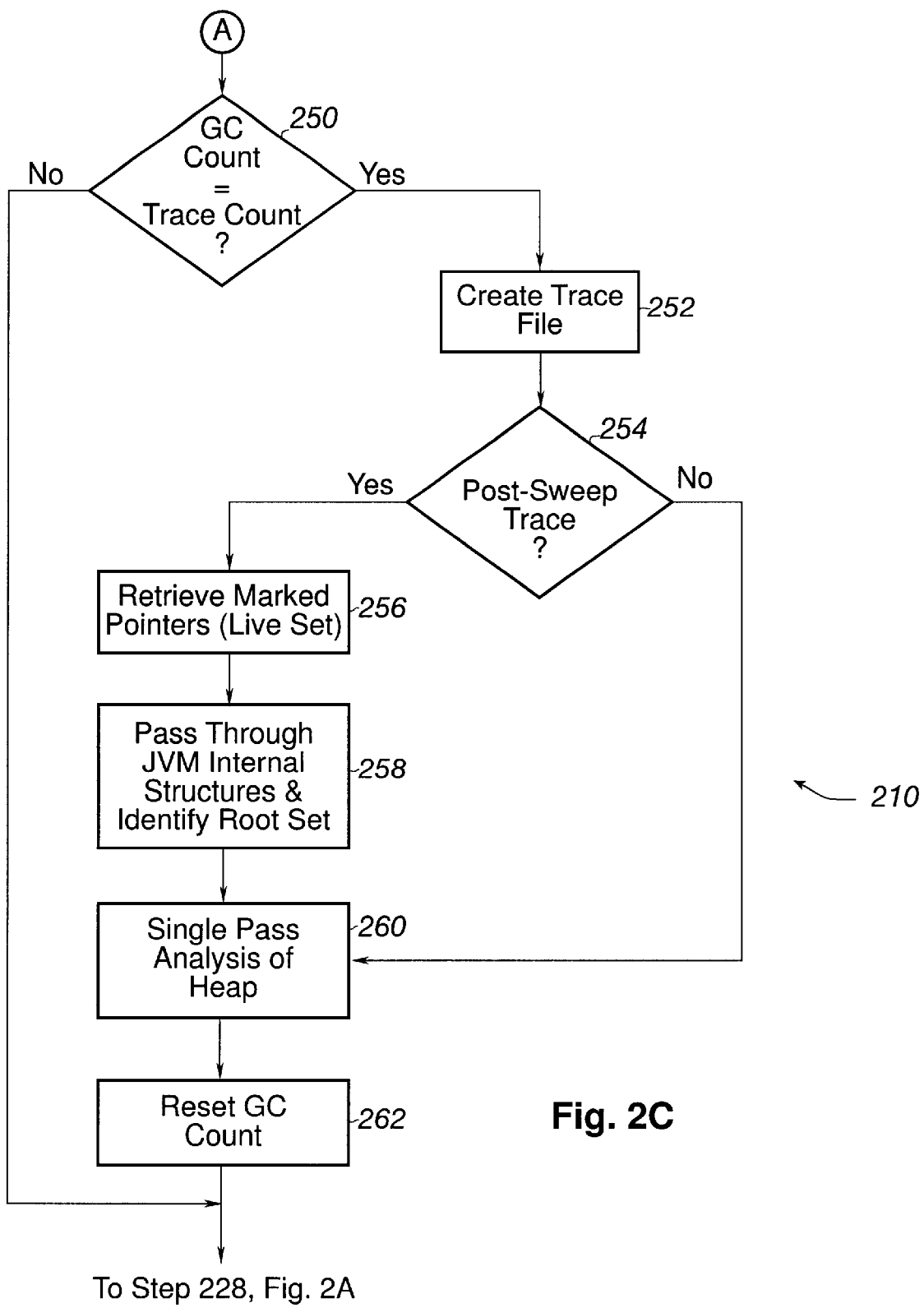
FIG. 2C illustrates, in flowchart form, a method of generating a trace file according to an embodiment of the present invention.

Trace file generation, step 210, may be further understood by referring now to FIG. 2C illustrating the flowchart of trace file generation step 210. Garbage collection instrumentation need not be performed during every garbage collection operation. In an embodiment of the present invention, the Nth garbage collection operation may be instrumented, where N is a preselected integer value, which may be set by an environmental value, as previously described. In step 250, the garbage collection count from step 203 is compared to the trace count N. If the garbage collection count and trace count are not equal, file generation is bypassed. Otherwise, step 210 proceeds to step 252.

In step 252, the trace file is created. If, in step 254, a post-sweep trace has been requested by, for example, setting a corresponding environmental value, trace file generation step 210 retrieves the marked pointers, that is, the live set, in step 256. In step 258, the root set, a subset of the live set, as previously discussed, is identified. In step 260, a single pass analysis, that is, a "walk-through" examination, of the heap is performed. In other words, a pass is made through the heap, which is delimited by a pair of memory addresses, from the "bottom" to the "top" of the heap. (In some operating system environments, heap space may grow downward in memory, so the "top" of the heap may correspond to a smaller memory address, and vice versa.) In step 262, the garbage collection counter is reset.

In passing through the heap, file generation step 210 collects information about the objects detected on the heap. The type of entry detected may be included, which may be free space, objects, arrays of objects, or primitive arrays. Entries corresponding to free space may include the heap address and the length of the free space. For objects, arrays of objects or primitive arrays, attributes may be indicated, for example, whether the object is pinned and whether the object is dosed. Pinned objects may not be moved during heap compaction. A dosed object is one that is pinned only for the current garbage collection. Additionally, a live set pointer associated with the object and the size of the object on the heap may be included. For objects that are not arrays of primitive objects, the class name of the object may also be included. Additionally, for objects and arrays of objects, addresses representing pointers to additional objects may also be included. These addresses are references to any other objects a particular object points to. For arrays of primitive objects, the primitive type may be included, as well as the contents of the array. After retrieving the aforementioned data, file generation step 210 then continues by returning to step 226, FIG. 2A.

If, in step 254, the trace file to be generated is a pre-mark trace or a post-compaction trace, then steps 256 and 258 are bypassed because live pointers are not marked before the garbage collection mark phase has been executed. Thus, the live set pointer information, discussed above, is not included in a pre-mark or post-compaction trace. Then, file generation step 210 immediately proceeds to step 260, performing a single pass analysis of the heap as described hereinabove.

Returning to FIG. 2A, if, in step 228, the trace file generated in step 210 is a pre-mark trace, instrumentation method 200 continues with the garbage collection by performing the garbage collection mark phase in step 212, discussed hereinabove. If, in step 228, the trace is not a pre-mark trace, instrumentation method 200 determines if the trace file generated in step 210 is a post-compaction trace file, step 230.

If, in step 230, the trace file generated in step 210 is a post-compaction trace file, instrumentation method 200 concludes garbage collection, in step 218. Otherwise, the trace file generated in step 210 must be a post-sweep trace file and, in step 230, instrumentation method 200 continues by performing garbage collection compaction, in step 224. After compaction in step 224, instrumentation method 200 continues with step 226 as previously discussed.

Although the present invention and its advantages have been described in detail, it should be understood that various changes, substitutions and alterations can be made herein without departing from the spirit and scope of the invention as defined by the appended claims.

What is claimed is:

1. A method of instrumenting garbage collection comprising the step of generating a trace file, wherein said step of generating a trace file comprises the steps of:

making a single pass analysis of each object on an object heap; and writing a plurality of object data retrieved in said single pass analysis to an output file.

2. The method of claim 1 wherein said step of generating a trace file further comprises the step of identifying a set of live objects.

3. The method of claim 2 wherein said step of generating a trace file further comprises the step of identifying a set of root objects, said set of root objects being a subset of said set of live objects.

4. The method of claim 2 further comprising the step of performing a garbage collection mark operation, wherein said set of live objects comprises a set of marked objects.

5. The method of claim 4 further comprising the step of performing a garbage collection sweep operation, wherein a second set of objects on said heap is removed from said heap, said second set being complementary to said set of live objects.

6. The method of claim 5 further comprising the step of garbage collection compaction, said heap retrieving a contiguous portion of memory space corresponding to an aggregation of memory space occupied by said second set of objects in response thereto.

7. The method of claim 1 further comprising the step of creating a memory mapped file including one or more control values, said one or more control values for controlling said garbage collection instrumentation.

8. The method of claim 7 further comprising the step of modifying at least one of said one or more control values in response to a user-determined event.

9. The method of claim 1 wherein said garbage collection instrumentation is performed at preselected intervals.

10. The method of claim 9 wherein said preselected interval is selected by setting a corresponding control value.

11. The method of claim 1 wherein said plurality of object data includes the object type, data values indicating one or more attributes associated with each object, object class names, and for a post-sweep trace, a live pointer associated with each live object.

12. A data processing system for instrumenting garbage collection comprising circuitry operable for generating a trace file, wherein said circuitry operable for generating a trace file comprises:

circuitry operable for making a single pass analysis of each object on an object heap; and circuitry operable for writing a plurality of object data retrieved in said single pass analysis to an output file.

13. The data processing system of claim 12 wherein said circuitry operable for generating a trace file further comprises circuitry operable for identifying a set of live objects.

14. The data processing system of claim 13 wherein said circuitry operable for generating a trace file further comprises circuitry operable for identifying a set of root objects, said set of root objects being a subset of said set of live objects.

15. The data processing system of claim 13 further comprising circuitry operable for performing a garbage collection mark operation, wherein said set of live objects comprises a set of marked objects.

16. The data processing system of claim 15 further comprising circuitry operable for performing a garbage collection sweep operation, wherein a second set of objects on said heap is removed from said heap, said second set being complementary to said set of live objects.

17. The data processing system of claim 16 further comprising circuitry operable for garbage collection compaction, said heap retrieving a contiguous portion of memory space corresponding to an aggregation of memory space occupied by said second set of objects in response thereto.

18. The data processing system claim 12 further comprising circuitry operable for creating a memory mapped file including one or more control values, said one or more control values for controlling said garbage collection instrumentation.

19. The data processing system of claim 18 further comprising circuitry operable for modifying at least one of said one or more control values in response to a user-determined event.

20. The data processing system of claim 12 wherein said plurality of object data includes the object type, data values indicating one or more attributes associated with each object, object class names, and for a post-sweep trace, a live pointer associated with each live object.

21. A computer program product operable for storage on program storage media, the program product operable for instrumenting garbage collection, the program product comprising programming operable for generating a trace file, wherein said programming operable for generating a trace file comprises:

programming operable for making a single pass analysis of each object on an object heap; and programming operable for writing a plurality of object data retrieved in said single pass analysis to an output file.

22. The computer program product of claim 21 wherein said programming operable for generating a trace file further comprises programming operable for identifying a set of live objects.

23. The computer program product of claim 22 wherein said programming operable for generating a trace file further comprises programming operable for identifying a set of root objects, said set of root objects being a subset of said set of live objects.

24. The computer program product of claim 22 further comprising programming operable for performing a garbage collection mark operation, wherein said set of live objects comprises a set of marked objects.

25. The computer program product of claim 24 further comprising programming operable for performing a garbage collection sweep operation, wherein a second set of objects on said heap is removed from said heap, said second set being complementary to said set of live objects.

26. The computer program product of claim 25 further comprising programming operable for garbage collection compaction, said heap retrieving a contiguous portion of memory space corresponding to an aggregation of memory space occupied by said second set of objects in response thereto.

27. The computer program product of claim 21 further comprising programming operable for creating a memory mapped file including one or more control values, said one or more control values for controlling said garbage collection instrumentation.

28. The computer program product of claim 27 further comprising programming operable for modifying at least one of said one or more control values in response to a user-determined event.

29. The computer program product of claim 21 wherein said plurality of object data includes the object type, data values indicating one or more attributes associated with each object, object class names, and for a post-sweep trace, a live pointer associated with each live object.

* * * * *